United States Patent
Reynolds et al.

(10) Patent No.: US 11,162,529 B2
(45) Date of Patent: Nov. 2, 2021

(54) DOUBLE ROW TAPERED BEARING WITH PRESS FIT PRELOADING ELEMENTS

(71) Applicant: Sandcraft LLC, Phoenix, AZ (US)

(72) Inventors: Brent G. Reynolds, Phoenix, AZ (US); Jonathan D. Roberts, Glendale, AZ (US); Jordan Hooper, Queen Creek, AZ (US)

(73) Assignee: SANDCRAFT, LLC, Phoenix, AZ (US)

( * ) Notice: Subject to any disclaimer, the term of this patent is extended or adjusted under 35 U.S.C. 154(b) by 0 days.

(21) Appl. No.: 17/146,398

(22) Filed: Jan. 11, 2021

(65) Prior Publication Data

US 2021/0207653 A1 Jul. 8, 2021

Related U.S. Application Data

(60) Provisional application No. 62/959,759, filed on Jan. 10, 2020.

(51) Int. Cl.
*F16C 19/38* (2006.01)
*F16C 35/07* (2006.01)
(Continued)

(52) U.S. Cl.
CPC ........ *F16C 19/385* (2013.01); *B60B 27/0073* (2013.01); *F16C 33/783* (2013.01);
(Continued)

(58) Field of Classification Search
CPC .... F16C 19/385; F16C 19/386; F16C 19/543; F16C 35/063; F16C 35/073; F16C 35/077;
(Continued)

(56) References Cited

U.S. PATENT DOCUMENTS 2,506,278 A * 5/1950 Ristow .................. F16C 25/083
  384/584
3,006,701 A * 10/1961 Curtis ................. F16C 33/7889
  384/485
(Continued)

FOREIGN PATENT DOCUMENTS

CN 106641196 A 5/2017
DE 102010040748 A1 3/2012
(Continued)

OTHER PUBLICATIONS

"Setting Techniques for Tapered Roller Bearings" <https://www.timken.com/wp-content/uploads/2016/10/5556_Bearing-Setting-Brochure-1.pdf> 2015, Date Accessed: Feb. 13, 2019.
(Continued)

*Primary Examiner* — Alan B Waits
(74) *Attorney, Agent, or Firm* — Booth Udall Fuller, PLC

(57) ABSTRACT

A UTV double row tapered wheel bearing assembly may include a first inner diameter race, a second inner diameter race axially offset from the first inner diameter race, and an outer diameter race radially offset from the first inner diameter race and the second inner diameter race, the outer diameter race formed as a single integral member. A first ring of rollers may be disposed between the outer diameter race and the first inner diameter race. A second ring of rollers may be disposed between the outer diameter race and the second inner diameter race. A first shield may be coupled to a first axial face of the bearing, and a second shield may be coupled to the second axial face of the bearing.

14 Claims, 12 Drawing Sheets

(51) Int. Cl.
*F16C 33/80* (2006.01)
*F16C 33/78* (2006.01)
*B60B 27/00* (2006.01)
*F16C 35/073* (2006.01)

(52) U.S. Cl.
CPC .......... *F16C 33/7886* (2013.01); *F16C 33/80* (2013.01); *F16C 35/073* (2013.01); *F16C 33/7813* (2013.01); *F16C 2326/02* (2013.01)

(58) Field of Classification Search
CPC ................ F16C 33/7813; F16C 33/783; F16C 33/7886; F16C 33/7889; F16C 2326/02; F16C 2229/00; F16C 33/80; B60B 27/001; B60B 27/0073; B60B 27/0078; B60B 35/001; B60B 35/18; B60B 2380/14; B60B 2380/75
See application file for complete search history.

(56) References Cited

U.S. PATENT DOCUMENTS

| | | | | |
|---|---|---|---|---|
| 3,049,357 | A * | 8/1962 | Kosatka | F16C 33/7813 277/565 |
| 3,336,998 | A * | 8/1967 | Avrea | B60B 27/065 180/339 |
| 4,043,620 | A * | 8/1977 | Otto | F16C 33/726 384/485 |
| 4,085,984 | A | 4/1978 | Cameron | |
| 5,009,523 | A | 4/1991 | Folger | |
| 5,281,004 | A * | 1/1994 | O'Leary, Jr. | B60B 27/001 301/105.1 |
| 5,328,275 | A * | 7/1994 | Winn | B60B 27/001 384/472 |
| 5,492,419 | A | 2/1996 | Miller | |
| 5,667,313 | A * | 9/1997 | Kapaan | B60B 27/001 384/544 |
| 5,904,427 | A * | 5/1999 | Braun | F16C 19/56 384/472 |
| 6,315,457 | B1 * | 11/2001 | Kapaan | B60B 27/001 384/544 |
| 6,561,559 | B1 * | 5/2003 | Skiller | F16C 35/063 295/36.1 |
| 6,880,841 | B2 * | 4/2005 | Wang | B60B 27/0005 280/93.512 |
| 2011/0021309 | A1 | 1/2011 | Loeshner | |
| 2013/0077905 | A1 * | 3/2013 | Shimizu | F16C 33/76 384/445 |
| 2013/0313799 | A1 * | 11/2013 | Ruedi | F16C 19/548 280/105 |
| 2015/0137585 | A1 * | 5/2015 | Ono | F16D 65/10 301/109 |
| 2017/0114832 | A1 * | 4/2017 | Katsaros | F16C 19/364 |
| 2019/0315400 | A1 * | 10/2019 | Gordon | B60G 3/14 |

FOREIGN PATENT DOCUMENTS

| | | | |
|---|---|---|---|
| JP | 2001182753 A | 7/2001 | |
| JP | 2006105320 A * | 4/2006 | ............ F16C 35/073 |
| JP | 2006183846 A | 7/2006 | |
| JP | 2006342830 A | 12/2006 | |
| JP | 2007046688 A | 2/2007 | |
| WO | 2014/112927 A1 | 7/2014 | |
| WO | 015/127913 A1 | 9/2015 | |

OTHER PUBLICATIONS

"Selecting Preload" <https://www.skf.com/us/products/bearings-units-housings/principles/bearing-selection-process/bearing-execution/internal-clearance-preload/selecting-preload/index.html> Date Accessed: Feb. 13, 2019.

"Measurement Accuracy Considerations for Tapered Roller Bearings" <https://www.generalbearing.com/assets/files/MAC%20for%20TRB.pdf> Date Accessed: Feb. 13, 2019.

* cited by examiner

DOUBLE ROW TAPERED BEARING WITH PRESS FIT PRELOADING ELEMENTS

RELATED APPLICATIONS

This application claims the benefit of, and claims priority to, of U.S. Provisional Patent Application No. 62/959,759, filed Jan. 10, 2020 titled "Double Row Tapered Bearing with Press Fit Preloading Elements," the entirety of the disclosure of which is hereby incorporated by this reference.

TECHNICAL FIELD

The present disclosure relates to bearings generally, and to roller bearings, and to bearings with press fit preloading elements, such as tapered bearings and double row tapered bearings. The present disclosure also relates to relates preventing contamination from entering wheel bearings.

BACKGROUND

A ball bearing is a type of rolling-element bearing that uses balls or spheres disposed between concentric rings or bearing races (such as an inner race and an outer race) to maintain the separation between the races. The balls or rolling-elements provide for relative movement between the concentric (inner and outer) races to support radial and axial loads while reducing rotational friction between the races by the rolling or rotation of the balls. The rolling or rotation of the balls provides for a lower coefficient of friction than if the two races were to rotate by sliding against each other.

Another type of bearing is a roller bearing. Roller bearings differ from ball bearings by using elongated rollers, rather than a ball or sphere, as the rotational element or feature between the inner race and the outer race. As such, the shape or area of contact between the rollers and the races in the roller bearing is straight line or elongated contact point, rather than a point or non-elongated contact area, present as the point of contact with a ball or sphere.

A roller bearing may comprise cylindrically shaped rollers, and in other instances, may also comprise frustoconically shaped rollers to form a tapered roller bearing. In a tapered roller bearing the rollers may be formed as tapered cylinders to simultaneously support axial loads, radial loads, and thrust loads.

SUMMARY

Aspects of this document relate generally to a wheel bearing, a double row tapered bearing with press fit preloading elements, an assembly therefore, or methods relating to the same. These aspects may comprise, and implementations may include, one or more or all of the components, steps, or both, set forth in the appended claims. In a general aspect, a wheel bearing assembly, or a UTV double row tapered wheel bearing assembly, may include an inner sleeve comprising an outer radial surface and a radially aligned circular ridge disposed at the outer radial surface configured to separate a first inner race and a second inner race. A first inner diameter race may be disposed around a first portion of the outer radial surface of the inner sleeve. A second inner diameter race may be disposed around a second portion of the outer radial surface of the inner sleeve. An outer diameter race may be radially offset from the first inner diameter race and the second inner diameter race, the outer diameter race may comprise an outer flat radial surface and an inner tapered radial surface opposite the outer flat radial surface. The outer diameter race may be formed as a single integral member, wherein outer axial surfaces of the outer diameter race overhang the outer axial surfaces of the first inner diameter race and the second inner diameter race. A first ring of rollers may be disposed between the outer diameter race and the first inner diameter race, wherein the first ring of rollers comprises rollers that are frustoconically shaped. A second ring of rollers may be disposed between the outer diameter race and the second inner diameter race offset from the first ring of rollers, wherein the second ring of rollers comprises rollers that are frustoconically shaped. A first shield may be coupled to a first axial face of the bearing configured to seal the interior of the bearing, the first ring of rollers, and the second ring of rollers from external contaminates. A second shield may be coupled to the second axial face of the bearing and configured to seal the interior of the bearing, the first ring of rollers, and the second ring of rollers from external contaminates.

In some aspects, the wheel bearing assembly may include the first shield and the second shield comprising seals that contact the inner radial surface of the outer race. The first shield may be press fit on the first inner diameter race and further seal with a stepped surface of the inner sleeve. The outer axial surfaces of the outer diameter race may overhang outer axial surfaces of the inner sleeve. The preload to the wheel bearing may be applied through tightening a nut to 40-180 ft-lbs or torque. A method of installing the UTV double row tapered wheel bearing assembly may comprise tightening a nut on a wheel shaft to press the bearing against the snap ring by applying 80-140 ft-lbs of torque to the nut, wherein the force of the nut tightening on the wheel shaft presses the first shield against the inner diameter race. The inner diameter race may press against the first ring of rollers, and the first ring of rollers may press against the outer diameter race, and the first ring of rollers may move towards a circular ridge of the inner sleeve.

In some aspects, a wheel bearing assembly, or a UTV double row tapered wheel bearing assembly, may include an inner sleeve comprising an outer radial surface, a first inner diameter race disposed around a first portion of the outer radial surface of the inner sleeve, and a second inner diameter race disposed around a second portion of the outer radial surface of the inner sleeve. An outer diameter race may be radially offset from the first inner diameter race and the second inner diameter race. The outer diameter race may comprise an outer flat radial surface and an inner tapered radial surface opposite the outer flat radial surface. The outer diameter race may be formed as a single integral member. A first ring of rollers may be disposed between the outer diameter race and the first inner diameter race. A second ring of rollers may be disposed between the outer diameter race and the second inner diameter race offset from the first ring of rollers. A first shield may be coupled to a first axial face of the bearing, and a second shield may be coupled to the second axial face of the bearing.

In some further aspects, the wheel bearing assembly may further include the inner sleeve comprising a radially aligned circular ridge that separates the first inner race and the second inner race. The first shield and the second shield may be configured to seal the interior of the bearing and the first ring of rollers and the second ring of rollers from external contaminates. The first shield and the second shield may comprise seals that contact the inner radial surface of the outer race. Outer axial surfaces of the outer diameter race may overhang outer axial surfaces of the first inner diameter race and the second inner diameter race. The first shield may be press fit on the first inner diameter race and further seal with a stepped surface of the inner sleeve. The preload to the wheel bearing may be applied through tightening a nut to 40-180 ft-lbs or torque. The rollers of the first ring of rollers and of the second ring of rollers may be frustoconically shaped. A method of installing the UTV double row tapered wheel bearing assembly may comprise tightening a nut on a wheel shaft to press the bearing against the snap ring by applying 80-140 ft-lbs of torque to the nut. The force of the nut tightening on the wheel shaft may press the first shield against the inner diameter race, the inner diameter race may press against the first ring of rollers, and the first ring of rollers may press against the outer diameter race, and the first ring of rollers may moves towards a circular ridge of the inner sleeve.

In some aspects, a wheel bearing assembly, or a UTV double row tapered wheel bearing assembly, may include a first inner diameter race, a second inner diameter race axially offset from the first inner diameter race, and an outer diameter race radially offset from the first inner diameter race and the second inner diameter race. The outer diameter race may be formed as a single integral member. A first ring of rollers may be disposed between the outer diameter race and the first inner diameter race. A second ring of rollers may be disposed between the outer diameter race and the second inner diameter race. A first shield may be coupled to a first axial face of the bearing. A second shield may be coupled to the second axial face of the bearing.

In some further aspects, the wheel bearing assembly may further include an outer axial surfaces of the outer diameter race overhanging outer axial surfaces of the first inner diameter race and the second inner diameter race. The first shield and the second shield may comprise seals that contact the inner radial surface of the outer race. The first shield may be press fit on the first inner diameter race and further seals with a stepped surface of an inner sleeve. Preload to the wheel bearing may be in a range of 40-180 ft-lbs or torque. A method of installing the UTV double row tapered wheel bearing assembly may comprise tightening a nut on a wheel shaft 80-140 ft-lbs of torque. The force may press the first shield against the inner diameter race, the inner diameter race may press against the first ring of rollers, and the first ring of rollers may press against the outer diameter race.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

Unless specifically noted, it is intended that the words and phrases in the specification and the claims be given their plain, ordinary, and accustomed meaning to those of ordinary skill in the applicable arts. The inventors are fully aware that he can be his own lexicographer if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements. Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

Figure 1A:
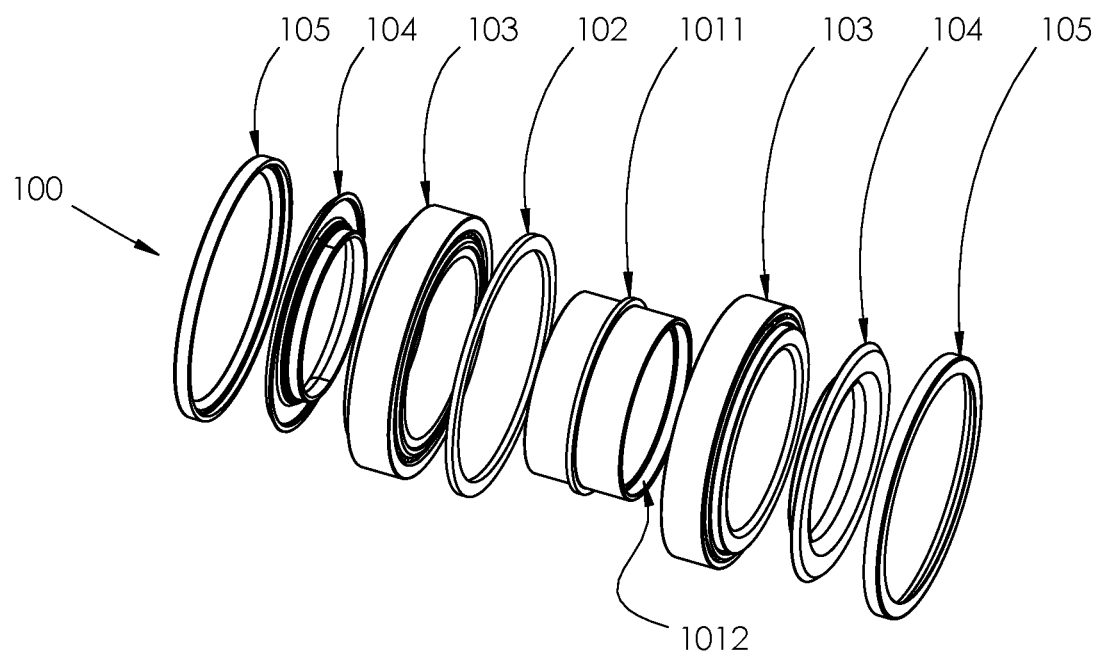
FIG. 1A depicts, according to an aspect, an exploded perspective view of a sealed double tapered roller bearing with inner diameter shields and outer diameter shields.

This disclosure, its aspects and implementations, are not limited to the specific structures, arrangements, material types, components, methods, or other examples disclosed herein. Many additional structures, arrangements, material types, components, methods, and procedures known in the art are contemplated for use with particular implementations from this disclosure. Accordingly, although particular implementations are disclosed, such implementations and implementing components may comprise any components, models, types, materials, versions, quantities, and/or the like as is known in the art for such systems and implementing components, consistent with the intended operation.

The words "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes embodiments of many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated. There are many features of a tapered press fit bearing and method implementations disclosed herein, of which one, a plurality, or all features or steps may be used in any particular implementation.

All amounts that are "about" or "substantially" equal to a given amount number, range, value, or quantity (hereinafter collectively "amount") include both the amount and may include any amount within a range of +/−0-50%, 0-40%, 0-30%, 0-20%, 0-10%, and 0-5%. The articles "a", "an", and "the" each refer to one or more than one, unless otherwise indicated by the context of the specification. The disclosure of ranges includes the range itself and also anything subsumed therein, as well as endpoints. For example, disclosure of a range of 2.0 to 4.0 includes not only the range of 2.0 to 4.0, but also 2.1, 2.3, 3.4, 3.5, and 4.0 individually, as well as any other number subsumed in the range. Furthermore, disclosure of a range of, for example, 2.0 to 4.0 includes the subsets of, for example, 2.1 to 3.5, 2.3 to 3.4, 2.6 to 3.7, and 3.8 to 4.0, as well as any other subset subsumed in the range. Similarly, the disclosure of Markush groups includes the entire group and also any individual members and subgroups subsumed therein.

This disclosure, its aspects and implementations, are directed to an assembly for double row tapered bearings, tapered bearings, double row bearings, keeping contaminants from degrading bearings, and methods for using, arranging, or preloading the same. Double row tapered bearings and double row angular bearings are bearings with inner races or rings (hereinafter referred to as races) and outer races, which instead of having a single row of ball bearings or roller bearings, have a double row of cylindrical rollers (angular) or a double row of slightly conical (tapered) rollers. Tapered roller bearings are designed to withstand greater radial and thrust loads than ball bearings.

In the past, double row bearings have been formed with two sets of rollers that are held in place by two corresponding spacers/cages for separating the rollers. The two sets of rollers are sandwiched between a single integrally formed outer race and a single integrally formed inner race. The position between the upper and lower races is fixed, with the position of the rollers and spacers also being fixed relative to the inner and outer races so that an amount of contact/pressure/friction which is known as "preload" between the moving parts of the bearing (i.e. inner race, rollers, and outer race) is fixed or constant.

Conventionally, preloaded bearings have been used on an external basis, such as by sliding the bearing onto a shaft and fastened the bearing, and preloading the bearing, based on a position on the shaft, such as by tightening the bearing on the shaft with a nut. To the contrary, and as shown, e.g., in Applicant's FIG. 2C, the present disclosure presents a new structure and method for internally mounting the bearing 100, such that the bearing 100 fits, and is internally mounted (or coupled with a female mounting) inside a bearing cup, bearing pocket, or recess 406 within an wheel bearing assembly 405, which is contrary to conventional external mounting that occurs by sliding a bearing onto a male type shaft, as in often present on trailers, tractors, and other vehicles.

Applicant has discovered benefits for the new double tapered wheel bearing disclosed for in for applications with UTVs, such as for (but not limited to) the Polaris RZR platform. As user herein UTVs include utility terrain vehicles and universal task vehicles, as well as four-wheel drive vehicle, two-wheel drive vehicle, sandrails, dune buggies, all-terrain vehicles (ATV), trucks, off-road vehicles, sport utility vehicles, recreational vehicles, defense vehicles, race vehicles, competition type vehicles, or other similar vehicles, whether or not the vehicle is street legal, and whether the vehicle is powered by gasoline combustion engines, pre-detonation or diesel engines, or other engines using propane, natural gas, or any other fuel, as well as vehicles powered by electric motors. As such, the new double tapered wheel bearing disclosed herein is applicable to the Polaris RZR platforms, and is also be applicable to other UTVs as well.

For example, Applicant has noted that Polaris machines, like RZRs, are often having wheel bearing issues with their double ball bearing split face bearing. For example, Applicant has noted that the double ball bearing split face bearing, Polaris Part #3514822, is susceptible to being contaminated by sand, dirt, mud, and water. In determining a structure or system that would overcome the above issues, Applicant considered a true automotive type tapered bearing, and in searching for such a suitable off the shelf solution, discovered that such a bearing of the correct dimensions, shape, size, and diameter, was not available. Additionally, while in theory adapting bearing dimension to a desired dimension, shape, size, and diameter, so as to fit within the parameters of the stock RZR hub, the machining precision to produce such a part is technically difficult and expensive to the point it is rendered impractical and unsuitable for its intended use.

The manufacture of bearings, such as to form a new bearing for an existing bearing pocket, is such a specialized process and requires such precision, that only a few companies in the world have the equipment and expertise to perform the work. Additionally, modifying the parameters of the stock RZR hub is also impractical, and is a decision at the discretion of Polaris. In light of the considerations noted above, Applicant developed a new system in which existing bearings may be used with additional components that may be produced or machined with less technical difficulty than machining the bearing itself, so as to produced improved results for UTVs, like the Polaris RZRs.

FIGS. 1A-2C depict various views of a sealed double tapered roller bearing 100, according to an aspect in which the bearing 100 comprises a device or assembly formed as a double row bearing comprising two single row bearings. Among the figures, like elements are represented by like element numbers or items numbers. Element 101 is an inner sleeve. Element 102 is an outer spacer. Element 103 is a bearing or a single row bearing, such as an angular wheel bearing assembly or a tapered bearing. Element 104 is an inner diameter (ID) shield. Element 105 is an outer diameter (OD) shield. All of the elements 101-105 shown in the figures may be made of metal, such steel, aluminum, or other desirable material. As shown in the figures, the outer spacer 102 and the two single row bearings or angular/tapered bearings 103 can be mounted/attached to an inner sleeve 101. Two ID shields 104 are press fit onto the outsides of the opposing inner races, and two outer diameter shields 105 are press fit onto the outsides of the two opposing outer races.

Figure 2A:
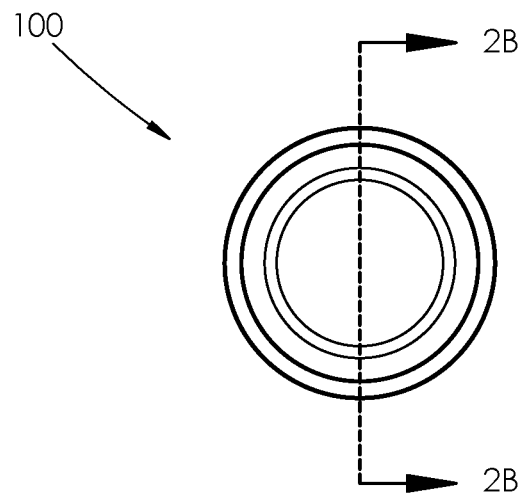
FIGS. 2A-2C depict various views of the sealed double tapered roller bearing of FIGS. 1A and 1B.

FIG. 1A depicts an exploded perspective view of a sealed double tapered roller bearing 100 with inner diameter shields 104 and outer diameter shields 105. Inner sleeve 101 allows for the ID of a standard bearing with a desired outer diameter to be adjusted to a correct size for a standard shaft. The inner sleeve 101 comprises an outer ridge 1011 in the center of the sleeve 101 to keep the two tapered bearings 103 apart enough so that the tapered roller cages do not touch when assembled. The inner sleeve or race 101 also comprises a step, notch, recess, or channel 1012 along the inside or inner diameter, opposite the center ridge 1011 at the outer diameter that allows for bearing load transfer and sealing of the rollers within the bearings 103 from contamination by being mateably coupled with ID shield 104, which is discussed in greater detail below. As shown, e.g., in. FIGS. 2A and 2C, inner sleeve 101 can hold 70%, or about 70%, of the inner race of the bearing 103 in place while maintaining its center mass. The OD of the bearings 103 stays the same maintaining the load rating of the bearings 103 in the new bearing system and structure, while the inner diameter of ID shield 104 steps down to allow for strength of inner sleeve 101 and bearings 103 to be maintained while being mateably coupled with ID shield 104. Taken together, ID shield 104 allows the main dynamic load of the bearing assembly to be supported by a robust structure comprising interrelated parts for improved size, seal, and loading.

Outer spacer 102 is designed to set the preload of the outer races 103, which ultimately will set preload on the bearings 103. As such, a method of assembling and using the above described device is also contemplated, to allow a desired amount of preloading to be set for the bearing. Too much preload will cause the bearing to over-heat and fail. Too little preload allows unwanted relative movement of bearings and undesired movement/vibration of the objects the bearing supports. Unlike conventional bearings where the preload is fixed and is not adjustable, the current assembly provides for customization of bearing preloading, an amount of which may be adjusted or controlled by the c clip or snap ring 202 with a tapered end being disposed within a notch, recess, or channel 206, of the bearing housing 204, as shown in FIG. 2C. The outer spacer 102 is designed to be thicker than the outer ridge 1011 of inner sleeve 101, allowing outer races of the bearings 103 to contact the outer spacer 102 while the inner races of the bearings 103 do not contact the inner ridge of inner sleeve 101, In some instances, the bearings 103 may be SKF bearing part #32910, which is a tapered roller bearing that comprises an outer diameter matching application for Polaris and other UTVs. Using a premanufactured bearing as part of a new bearing assembly allows for customized size and performance, without undertaking the expensive and difficult precision manufacturing required for creating the bearing itself.

ID shield 104 may mateably couple with inner sleeve 101 in a way that allows the bearings 103, the inner sleeve 101 and the ID shield 104 to operate as a composite, functional, or complete unit. ID shield 104 slides into inner sleeve 101 so as to maintain the strength of the outer edge of the bearing 103, while also providing for a precise or water-tight fit that acts as a seal to protect contamination from entering through the ID of the bearing. Applicant has discovered a flaw with conventional or original equipment manufacturer (OEM) ball bearings, in that they do not seal on the ID of the bearing, allowing unwanted debris and contaminates to enter the bearing to decrease bearing performance and reduce bearing life as a result of damage or wear and tear being incurred on the bearing.

ID shield 104 also provides for the additional benefit of setting preload by allowing the inner races on the ID portion of bearings 103 to keep sliding inward (in response to ID shield 104), thus applying pressure on the inner race of the tapered roller bearing which makes the pressure increase on the outer spacer 102 adding the outer race preload. ID shield 104 also wraps the inner race of the bearing 103 in a way that allows the entire inner race of the bearing 103 to spin freely, not interfering with the outer race of the bearing 103, the outer race of the bearing 103 being pressed into the bearing housing and not rotating at all, as described with respect to FIG. 2C.

ID shield 104 may also comprise its top edge being tapered in a way to act as a diagonal shield to begin the sealing process. This may be a delicate process in creating the "sealed tapered roller bearing" to function. The diagonal taper also holds the outer edge of the tapered roller cage, the diagonal taper constraining or trapping tapered roller cage so as to prevent the tapered roller cage from sliding upwards and slipping out and off the inner bearing race 103. This allows the entire assembly to be held together, and function in a way similar to a traditional tapered roller bearing. In the present arrangement, however, the shields 104 and 105 allow the bearing to be "sealed" to advantageously prevent dirt, sand, mud, water, and other foreign debris from entering/contaminating and decreasing performance of the bearing.

OD shield 105, as noted above, allows the bearing to be "sealed" with the interaction of shield 104, by having a tapered angle opposite to the tapered angle of shield 104. The angle of OD shield 105 forces any potential contamination to travel upward and inward making it a more natural barrier of defense against contamination. OD shields 104 and 105 overlap when viewed from an axial direction of the shaft, preventing line of sight into the bearing rollers (or balls) reducing or preventing contamination from entering the bearing, reducing or preventing a straight horizontal gap which would be a easier route for contamination to enter.

The interface at of OD shields 104 and 105 at their overlap may comprise an integrated seal, such as a swiper seal.

OD shield 105, in addition to allowing the bearing to be "sealed" with the interaction of shields 104 and 105, may push the outer race 103 inward towards a position to not let the bearing to be over loaded by setting to much preload. As seen in FIG. 2C, this may be accomplished by having the OD shield 105 rests against a shouldered edge on "one side" of the bearing pocket, which traps the bearing and stops it from moving. The "other side" OD shield 105, opposite the shouldered edge, may be held in place by c clip or snap ring 202, which is also shown in FIG. 2C. This arrangement traps the bearings 103 into the pocket so that the axle can now slide thru allowing the bearing 103 to be installed in its final position. The tapered snap ring 202 allows the bearing 103 to have a constant preload without a human/installer tightening a nut to add preload to the bearing, as would be done with a conventional arrangement. As noted above, in some instance OD shield 105 may advantageously include a sealed rubber lip, or swiper seal, integrated in the ID tapered edge to provide a stronger seal and further prevent contaminants from entering the bearings 103, allowing the bearing assembly to function as a sealed bearing.

Figure 1B:
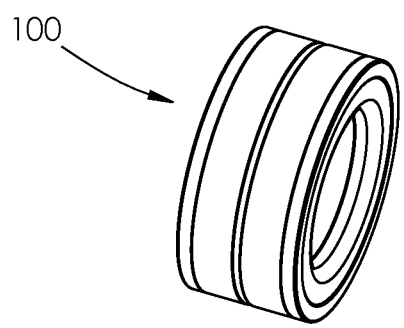
FIG. 1B depicts a non-exploded perspective view of the sealed double tapered roller bearing of FIG. 1A.

FIG. 1B depicts a non-exploded perspective view of the sealed double tapered roller bearing or bearing assembly 100 of FIG. 1A. The outer radial surface of the top is formed of multiple pieces, including upper seals or OD shields 105, upper or outer races of bearings 103, and the outer spacer 102. While the composite double row tapered bearing with press fit preloading elements 100 may function well in bearing pockets or cavities with tight tolerances, in situations where tolerances are not tight (such as when variation or inconsistencies of even 20 thousandths of an inch) are introduced among different vehicle hubs and bearing pockets, the additional space may prove problematic and cause unwanted movement of the bearing assembly 100 that results in damage to the hub, including the bearing pocket for the hub, and decreased performance or part failures.

Figure 1C:
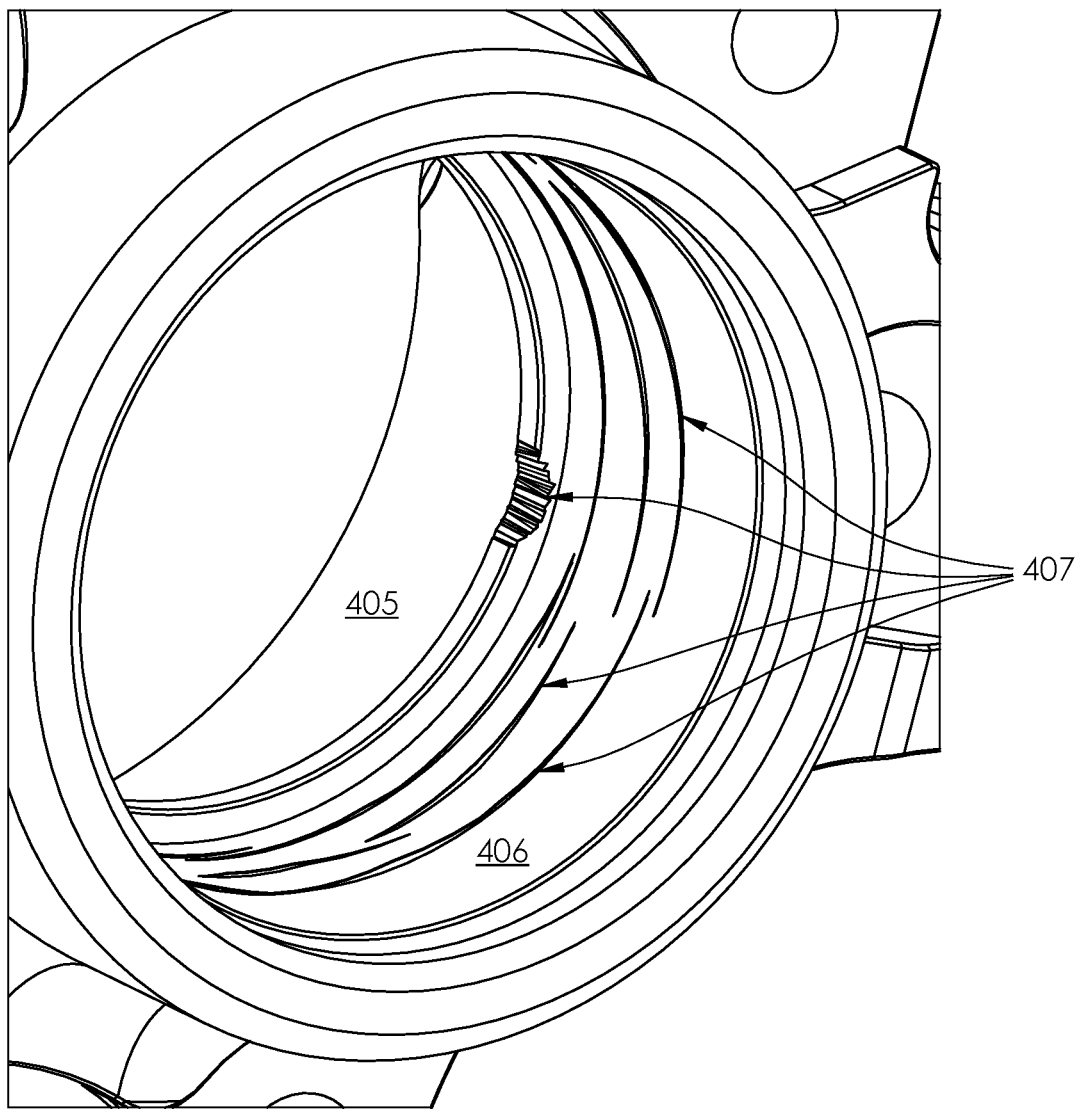
FIG. 1C depicts a broken away perspective view of a carrier bearing wheel assembly.

FIG. 1C shows an image of carrier bearing wheel assembly or wheel bearing assembly 405 comprising the bearing cup or bearing pocket 406 that housed the bearing 100 when tolerances allowed for undesired movement of the bearing 100 within the bearing cup 406, that resulted in damage or scaring 407 to the bearing cup 406 and wheel bearing assembly 405.

Figure 2B:
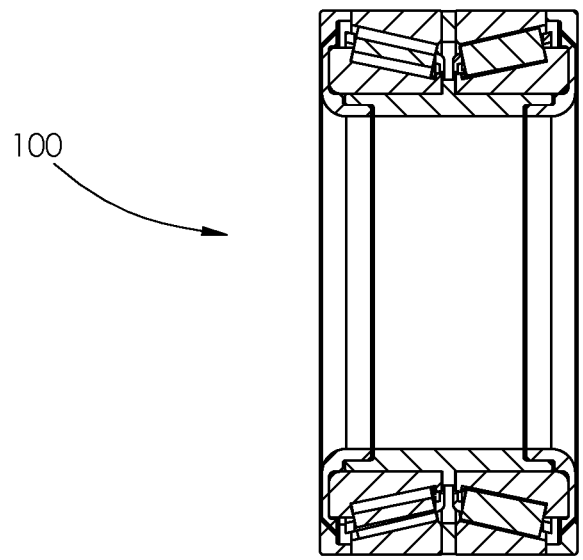
Figure 2C:
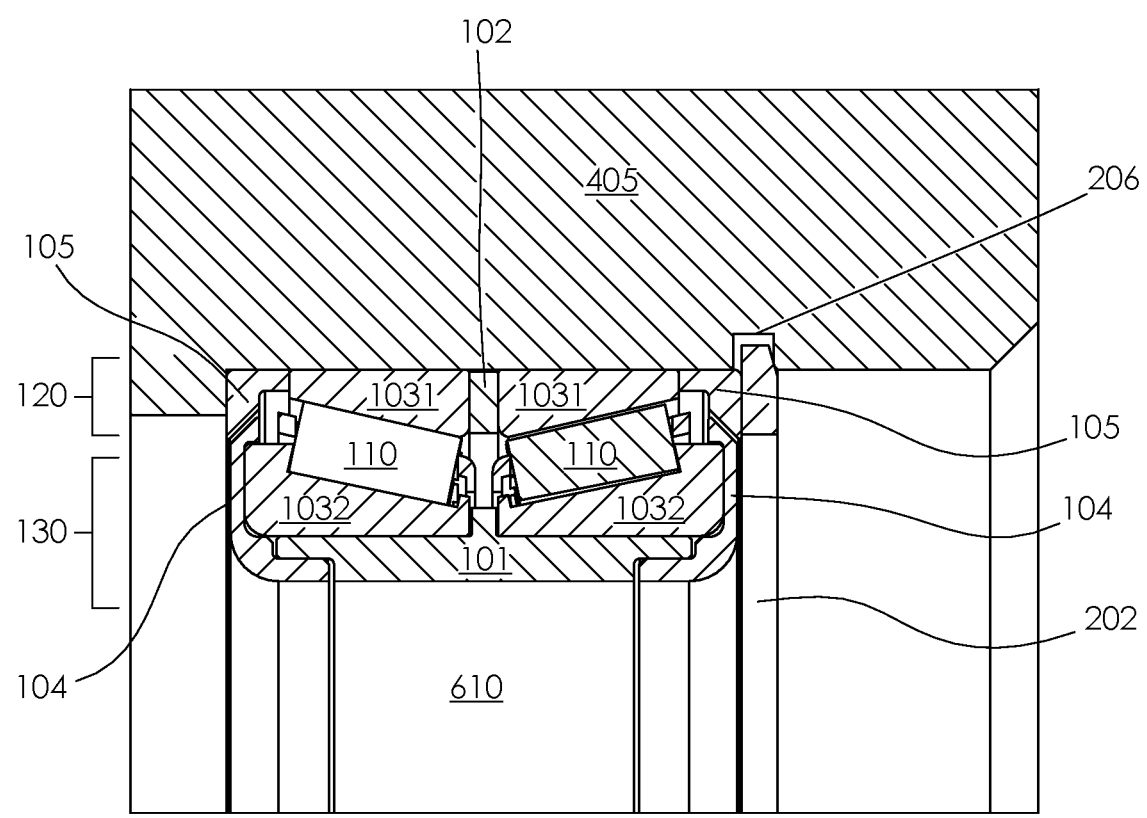

FIG. 2A depicts a side profile view of the sealed double tapered roller bearing 100 from FIGS. 1A and 1B that further includes section line 2B-2B, from which the view of FIG. 2B is taken.

FIG. 2B depicts a cross-sectional view of the sealed double tapered roller bearing 100 taken along the section line 2B-2B shown in FIG. 2A.

FIG. 2C depicts an enlarged cross-sectional view of an upper portion of the sealed double tapered roller bearing 100 from FIG. 2A, in which the fixed or stationary elements that do not rotate are the outer diameter elements 120 that include both outer diameter shields 105 (shown on the left and right of the FIG.), the outer diameter races 1031 (shown on the left and right of the FIG.), and the outer spacer 102. The rotating elements that do rotate with the wheel shaft 610 are the inner diameter elements 130 that include both inner diameter shields 104 (shown and the left and right side of the FIG.), the inner diameter races 1032 (shown on the left and right of the FIG.), the inner sleeve 101, and the rollers 110.

While the upper diameter elements 120 are tightly held together, the inner diameter elements 130 include gaps/spaces between ID shields 104 and the inner diameter race 1032 of bearing 103, as well as between the inner race 1032 of bearing 103 and the inner sleeve 101. As opposing ID shields 104 are pressed towards each other and towards the central ridge 1011 of inner sleeve 101, the ID races 1032 of bearings 103 move towards each other and push upwards against the rollers 110 of the bearings 103 such that the OD races 1031 of bearings 103 increase in preloading. A desired level of preloading can be applied by pushing the press-fit ID shields 104 together, before placing them within the wheel bearing assembly 405, allowing for customization of preloading of the Sealed Double Row Tapered Bearing 100, a feature previously unavailable.

Applicant's new system provides a solution that does not require the high precision machining required for producing a new bearing, but allows an existing bearing to be introduced into a new composite component that can service the preset dimensions that are on millions of Polaris UTVs. Applicant's new system provides a solution that provides good strength, ameliorates sealing problems, and addressing preloading issues and strengthens load bearing capacity over existing OEM parts.

Applicant's new system provides the features of: (i) two ID shields 104 press fit onto the outsides of the opposing inner races 1032; (ii) two OD shields 105 press fit onto or adjacent the outsides of the two opposing outer diameter races 1031; (iii) the ID shields 104 and OD shields 105 sealing the bearing 100 to prevent foreign debris from contaminating the bearing 100, and (iv) a method of setting a desired amount of preload as opposing ID shields 104 are pressed towards each other and towards the central ridge 1011 of the inner sleeve 101. Furthermore, the additional improvements of: (i) a tapered snap ring 22 being fit into a notch, recess, channel, or slot 206 in the bearing housing or wheel bearing assembly 405; and (ii) the pliable/deformable/rubber ridges and angled shoulder between the ID shield 104 and the OD shield 105 that seal the bearing device are also present.

Figure 3A:
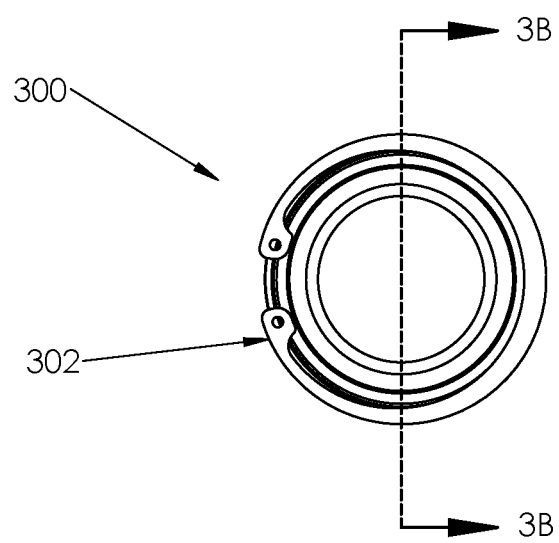
FIGS. 3A-3C depict various views of a sealed double tapered roller bearing of according to another aspect.
Figure 3B:
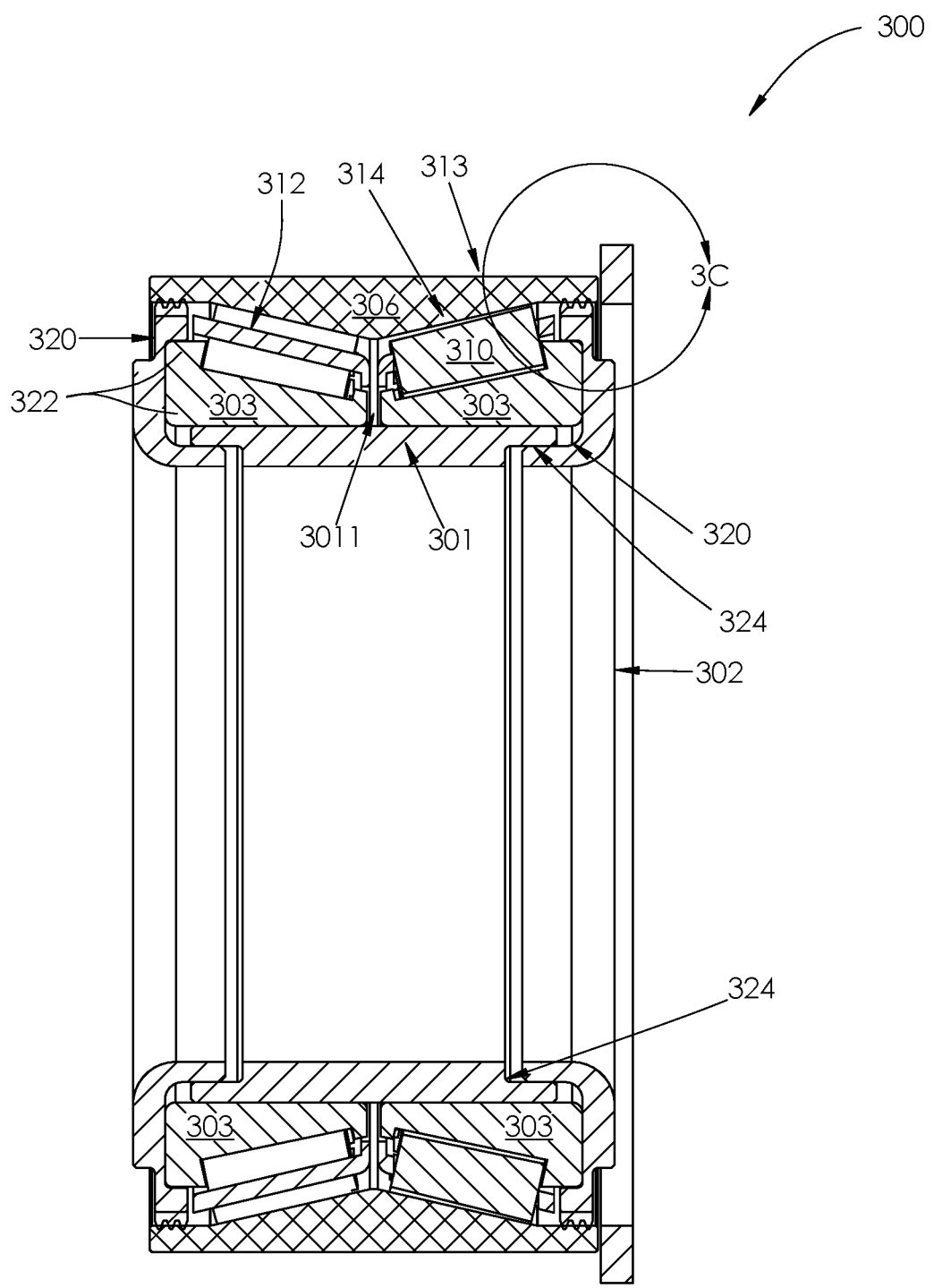
Figure 3C:
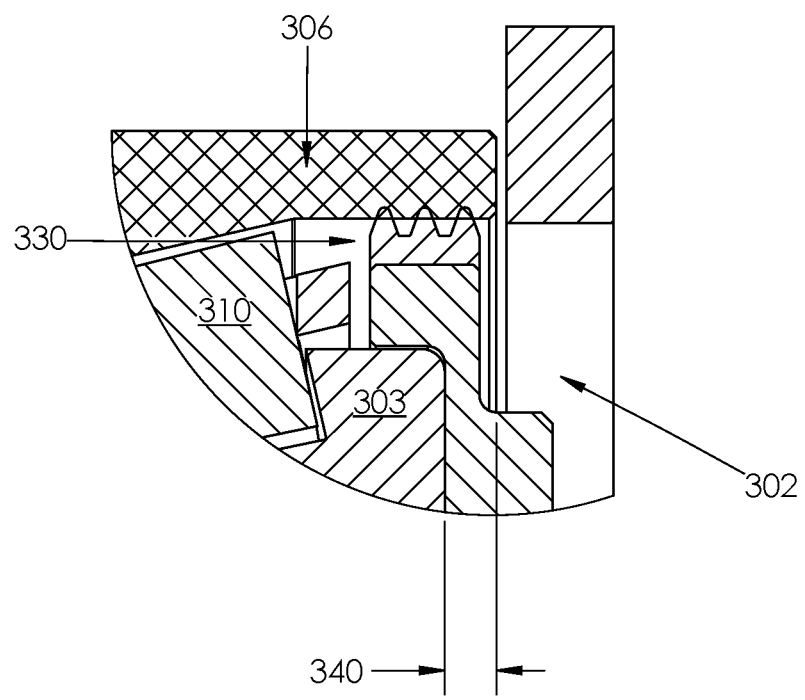

FIGS. 3A-3C depict various views of a bearing, bearing assembly, or double row tapered bearing with press fit preloading element 300 according to another aspect. FIG. 3A also shows a non-tapered c clip or snap ring 302 adjacent the bearing 300.

FIG. 3B depicts a cross sectional profile view of bearing 300 taken along section line 3B-3B shown in FIG. 3B. Like bearing 100, bearing 300 illustrates another aspect of double row tapered bearing with press fit preloading elements comprising an inner sleeve 301 comprising an outer ridge 3011 on the inner sleeve 301. The bearing 300 may be held in place within a bearing cup or bearing pocket 406 within the carrier bearing wheel assembly or wheel bearing assembly 405 with c clip or snap ring 302.

Like the bearing 100, the bearing 300 may comprise, or be formed with, components from separate individual single row tapered bearings. FIG. 3B shows the bearing 300 may comprise inner diameter races 303 of multiple single row bearings, such as an angular wheel bearing assembly or a tapered bearing 303. While two single row bearings 303 are shown in FIG. 3B, any number of suitable single row bearings may be used, based on a desired implementation, such as four single row bearings or any number of single row bearings 303. The rings of tapered rollers 310 may be arranged face-to-face (where load lines converge), in a back-to-back arrangement (where load lines converge), in matched pairings where adjacent rings of rollers 310 or ID races 303 are arranged in tandem, or any combination of the above. In any event, buy using tapered roller bearings, thrust loads applied to the bearings 300, such as through wheels or tires 505 of a UTV may be better supported than with other ball bearings or roller bearings.

Rollers 310 may be disposed within, or spaced apart by, a cage or spacer 312 while positioned circumferentially around the inner diameter races 303. An outer diameter (OD) race or OD double race 306 may be disposed opposite the ID races 303, sandwiching the rollers 310 between the ID races 303 and the OD race 306. Unlike with bearing 100 that had a segmented or multi-component OD race, the OD race 306 of the bearing 300 may comprise a single or integrally formed unitary OD race 306. The OD race 306 may comprise angled, sloped, or tapered inner diameter surfaces 314 that align, and are mateably coupled, with rollers 310. The inner tapered radial surfaces 314 may comprises a first angled surface and a second angle surface that meet at a circular ridge.

In other words, FIG. 3B illustrates a UTV double row tapered wheel bearing assembly 300 comprising an inner sleeve 301 comprising an outer radial surface with a radially aligned circular ridge 3011 that separates a first inner race 303 and a second inner race 303 (shown, e.g., on left and right sides of FIG. 3B). The first inner diameter race 303 may be disposed around a first portion of the outer radial surface of the inner sleeve 303. A second inner diameter race 303 may be disposed around a second portion of the outer radial surface of the inner sleeve. An outer diameter race 36 may be radially offset from the first inner diameter race 303 and the second inner diameter race 303, the outer diameter race 306 comprising an outer flat radial surface 313 and an inner tapered radial surface 314 opposite the outer flat radial surface 313. The outer diameter race 306 may be formed as a single integral member with an axial length La greater than an axial length measured between the axial surfaces of the ID races 303. Similarly, the outer diameter race 306 may comprise an axial length La greater than an axial length of the inner sleeve 301, so that the outer axial surfaces of the OD race 306 overhang or are offset with respect to the outer axial surfaces of the ID races 303 and the outer axial surfaces of the inner sleeve 101, where the axial direction is aligned with the direction of the shaft or wheel axel 610. As shown in FIG. 3B, the radial length Lr is orthogonal to the axial length La.

A first ring of rollers 310 may be disposed between the outer diameter race 306 and the first inner diameter race 303. A second ring of rollers 310 may be disposed between the outer diameter race 306 and the second inner diameter race 303, and further be offset from the first ring of rollers 310. The rollers 310 of the first ring of rollers and of the second ring of rollers may all be cylindrically shaped. Alternatively, the rollers 310 of the first ring of rollers and of the second ring of rollers may be frustoconically shaped. In either event, a size of the first ring of rollers (or rollers 310 within the first ring of rollers) may be equal to a size of a second ring of rollers (or rollers 310 within the second ring of rollers).

A first shield 320 may be coupled to a first axial face of the bearing 300, and a second shield 320 coupled to the second axial face of the bearing 300 (such as on opposing left and right sides of the FIG. 3B. The first shield 320 and the second shield 320 may be configured to seal the interior of the bearing 300 (including the rollers 310 and cage 312 of the first ring of rollers and the second ring of rollers) from external contaminates, such as dust, water, mud and other foreign debris from entering/contaminating and decreasing performance of the bearing. The first shield 320 and the second shield 320 may each comprise a bearing seal, sealed rubber lip, or swiper seal 330, that may be integrated in the OD edge to seals 320 to provide a stronger seal and further prevent contaminants from entering the bearings 300, allowing the bearing assembly to function as a sealed bearing. As shown in FIGS. 3B and 3C, the seal 330 may be formed of comprising a plurality of lips or ridges, such as three lip seals that contact the inner radial surface of the outer race 306. The outer race 306 may comprise an overhang 340 of the ID races 303 to facilitated the seals 330 mateably coupling with the inner surface of the OD race 306. In other instances, other suitable sealing configurations may also be used. The seal 330 may be formed of rubber or any other suitably deformable, durable, and temperature resistant material. The first shield 320 (as well as the second shield 320) may be press fit on ID and OD shoulders 322 of the first ID race 303 and further seal with a stepped surface 324 of the inner sleeve 301. The bearing seal 300 may provide a stronger seal and further prevent contaminants from entering the bearings 300, allowing the bearing assembly to function as a sealed bearing to advantageously prevent dirt, sand, mud, water, and other foreign debris from entering/contaminating and decreasing performance of the bearing 300. Heretofore, OEM assemblies on the Polaris Razor have included internal split face bearings, which have allowed contaminants to enter and damage the bearing, such as when entering water or mud with the UTV.

FIG. 3C depicts a close-up cross-sectional profile view of the portion of the bearing 300 shown by section line 3C from FIG. 3B. FIG. 3C. also shows that the bearing seals 330 may be elastically deformable and deform by an amount in which the seals 330 radially extend beyond the ID surface of the OD race 306, such as about 8 thousandths of an inch, or about 0.02032 mm.

The bearings 300 may be used for UTV wheel shafts or axels 610 by being coupled to the shaft 610 (shown in FIG. 6) and disposed between the carrier bearing wheel assembly or wheel bearing assembly 405 and the wheel hub 506, as shown, e.g., in FIGS. 4A-5B. The bearing 300 may also be preloaded by tightening a nut, castle nut, pinch bolt clamp, or pinch clamp nut 510 on the wheel shaft 610 to press the bearing 600 against the snap ring 302 by applying 25-180 ft-lbs of torque, or 80-140 ft-lbs of torque, or about 120 ft-lbs or torque to the nut. The nut then applies a force to the bearing 300, and transferring force through a first shield 320 to a first ID race 303 the inner sleeve 301 (including the ridge 3011), the second ID race 303 and the second shield 320. After the nut is tightened to a preferred amount of force, the nut 510 may be secured, and prevented from undesirably backing off or loosening, by being further secured to the wheel axel 610 with a cotter pin 512.

When force is applied to the ID races 303, some force is proportionally transferred to rollers 310, moving them more tightly against the stationary OD race 314, increasing the preload on the rollers 310 and the bearing 300. As the preload is increased, some movement of the rollers 310 may also occur, moving the roller closer towards the ridge 3011 or the center of the bearing 300. Movement during preloading may be facilitated by a gap, space, or offset G, that occurs between the shield 320 and the radial surfaces of the inner sleeve 301. Even with a gap G between the radial surfaces of the inner sleeve 301 and the shields 320, the shield 320 may tightly contact and form a waterproof seal with the stair-step 324 or axial surface of the inner sleeve 301.

Conventionally, bearings in automotive applications have been subjected to significantly lower loads, on the order of about 20 ft-lbs or torque, and teach away from higher forces that have been applied in industrial or non-automotive applications. Conventional high load applications have not involved weather proofing or sealing applications as disclosed herein by applicant.

Figure 4A:
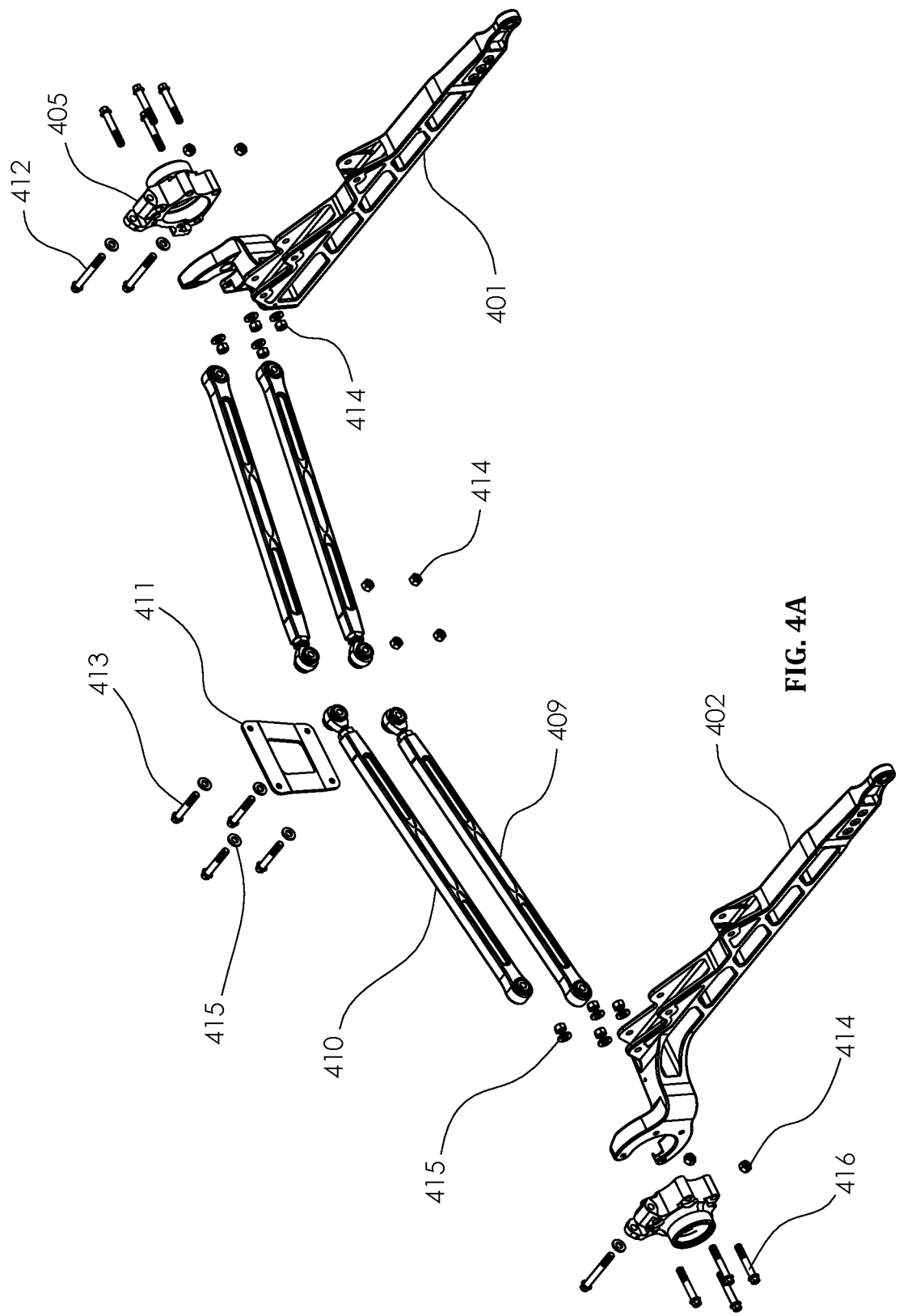
FIGS. 4A and 4B depict views of a UTV rear suspension elements compatible with improved UTV performance resulting from use of a sealed double tapered roller wheel bearing.
Figure 4B:
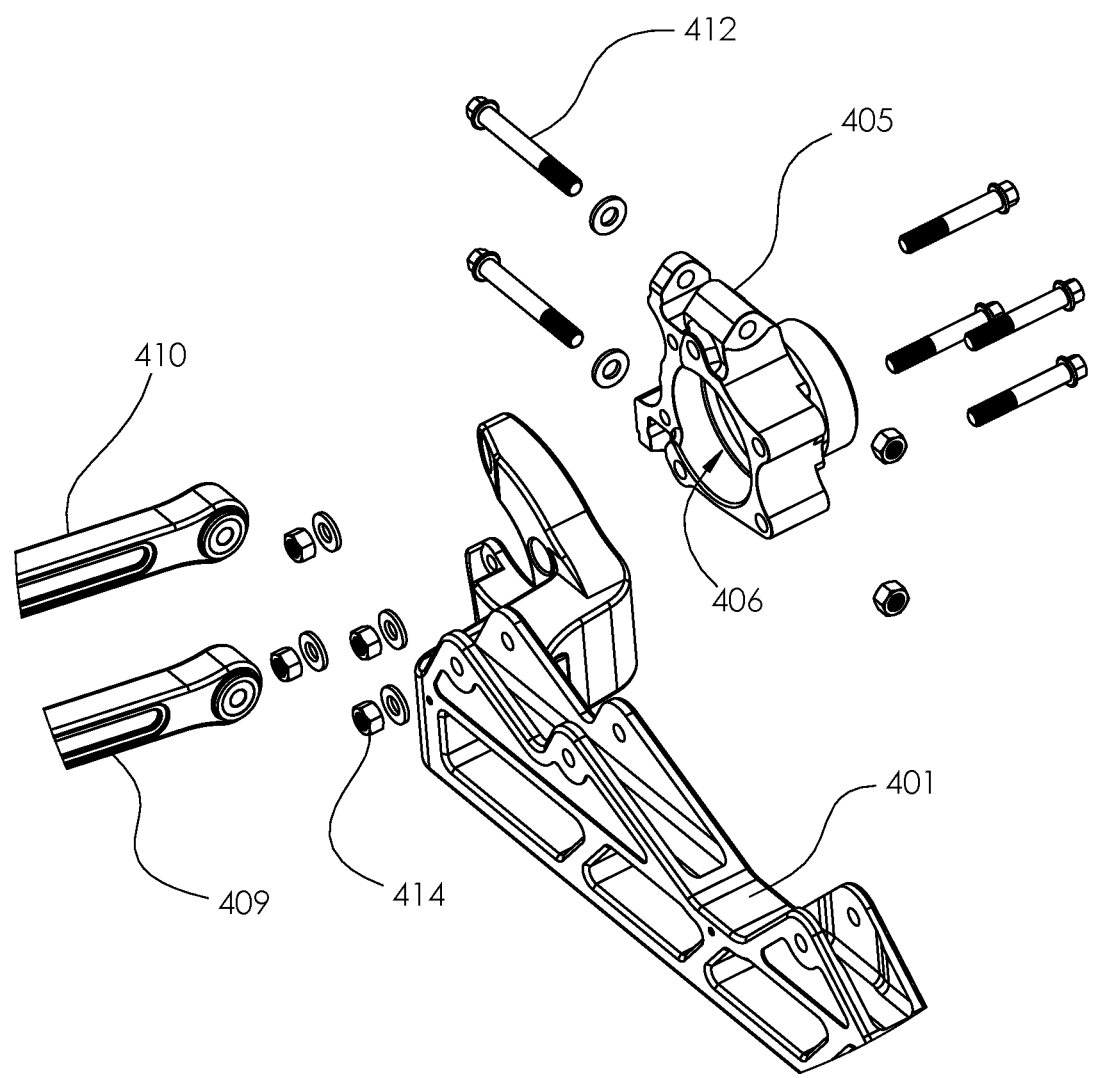

FIGS. 4A and 4B depict various views of UTV rear suspension elements compatible with improved UTV performance resulting from use of a sealed double tapered roller wheel bearings 100, 300. FIG. 4A shows the rear suspension for a Polaris Razor the left of the figure being the rear of the vehicle and the right of the figure being oriented towards the front of the vehicle. Element 401 is a left side rear control arm, element 40 is a right side rear control arm. Element 405 is a carrier bearing wheel assembly or wheel bearing assembly. Element 406 is bearing cup or bearing pocket within wheel bearing assembly 405, into which bearings 100, 300 may be disposed. Elements 409 and 410 are ASM-radius rod or control arm, which may also be referred to as a radius arm, torque arm, or torsion bar. Element 41 is a rear plate or bolt brace, elements 412, 413, 416 are mechanical fasteners or bolts, and elements 414 and 415 are mechanical fasteners or nuts. FIG. 4B in an enlarged close up view of the left side rear control arm 401 and the wheel bearing assembly 405.

Figure 5A:
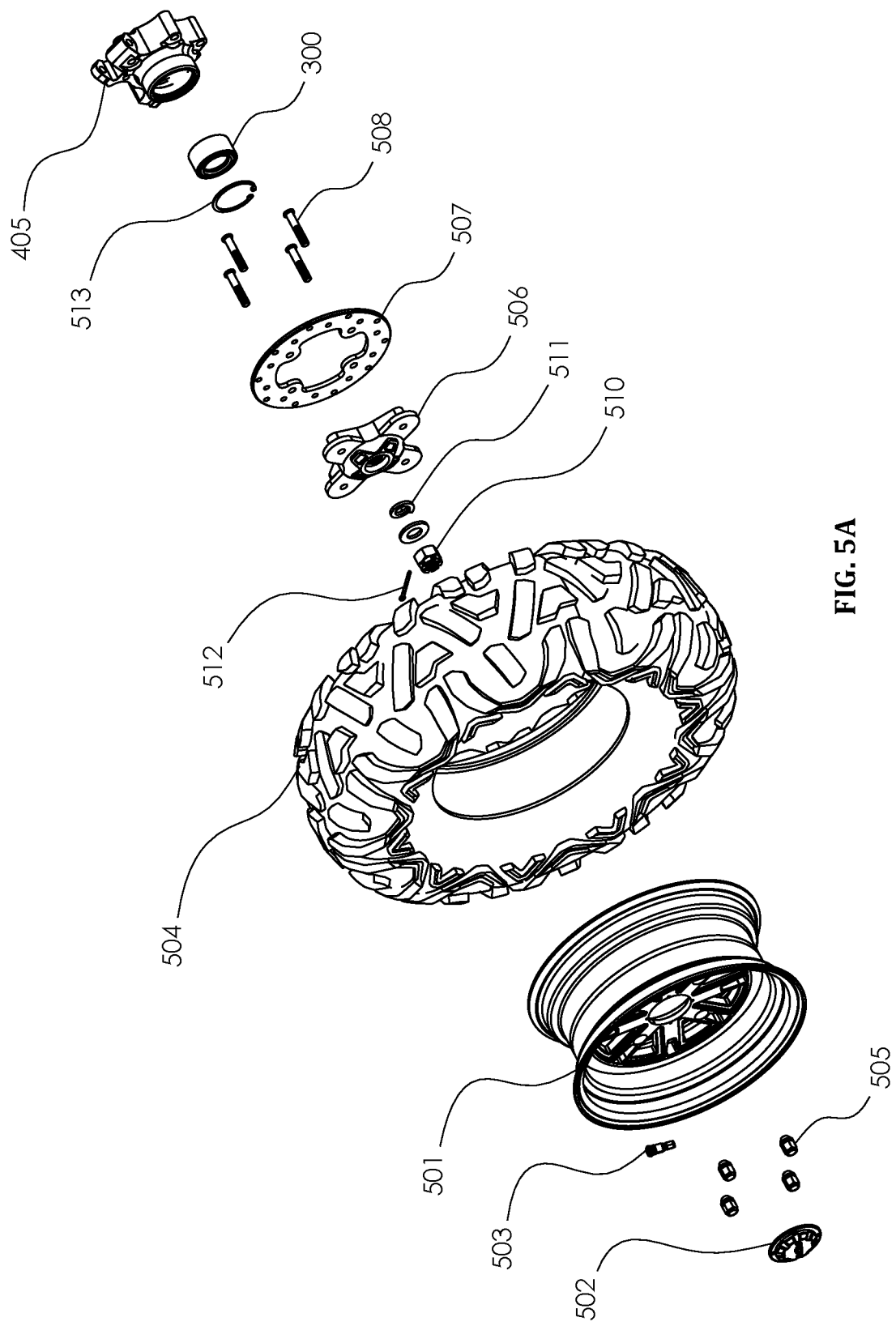
FIGS. 5A and 5B depict views of a UTV rear wheel elements compatible with improved UTV performance resulting from use of a sealed double tapered roller wheel bearing.
Figure 5B:
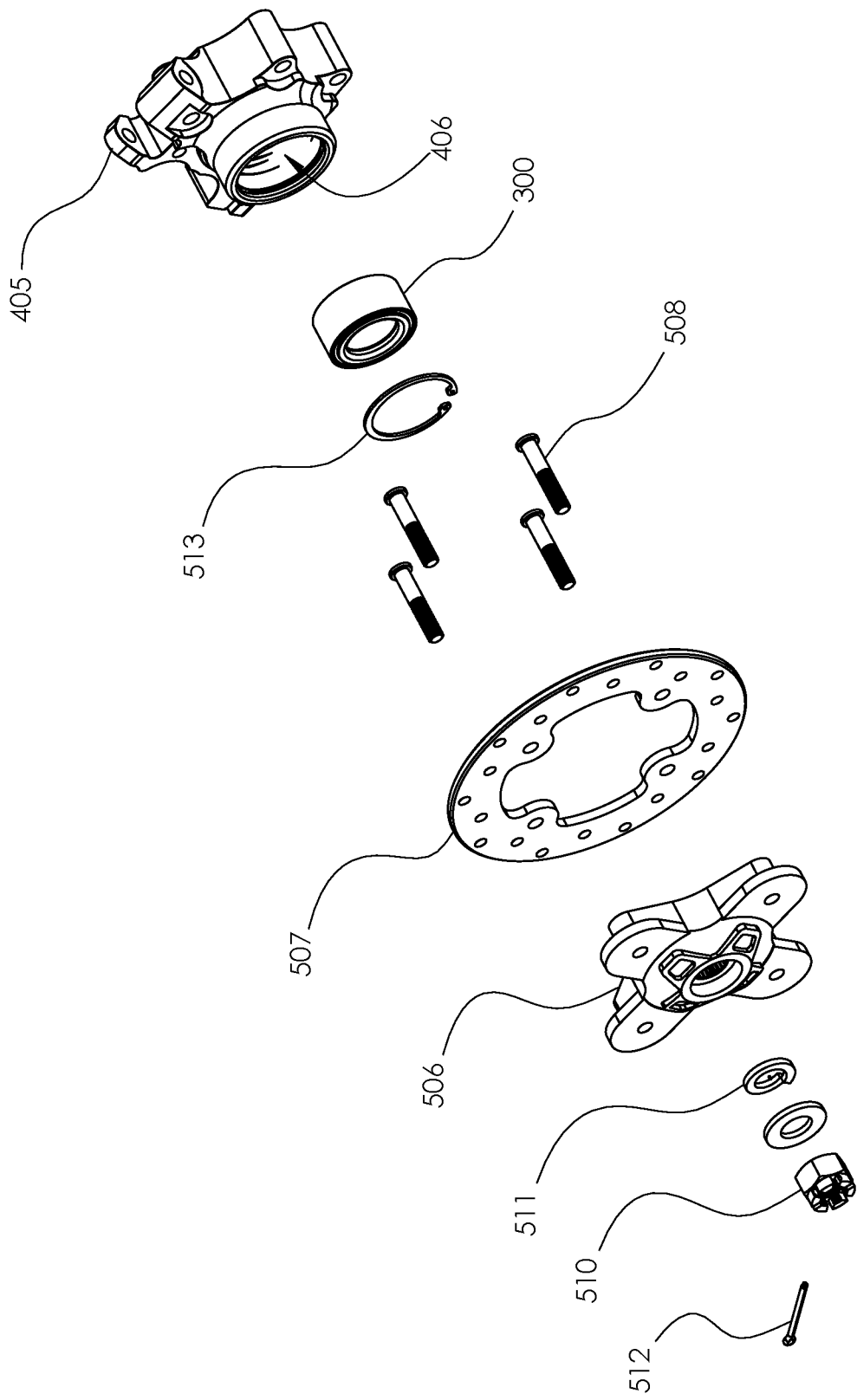

FIGS. 5A and 5B depict views of a UTV rear wheel elements compatible with improved UTV performance resulting from use of a sealed double tapered roller wheel bearings 100, 300. FIG. 5A shows the tire or wheel assembly for a right rear tire of a Polaris Razor, the left of the figure being the right rear of the vehicle. Element 501 is a wheel rim, element 502 is a rim cap, element 503 is a rim valve, element 504 is a tire, and element 505 is a wheel nut or lug nut. Element 506 is a wheel hub (with splines on inner annular surface to mateably couple with the splines of the wheel axel 610), element 507 is a disk brake or rotor, while elements 508 are wheel studs or lug bolts. Element 510 is a nut, castle nut, pinch bolt clamp, or pinch clamp nut. Elements 511 are washers, element 512 is a cotter pin, and element 513 is a retaining ring. FIG. 5B in an enlarged close up view of the right side of FIG. 5A, and shows an enlarged view of the wheel bearing assembly 405, bearing 100, 300, and wheel hub 506.

Figure 6:
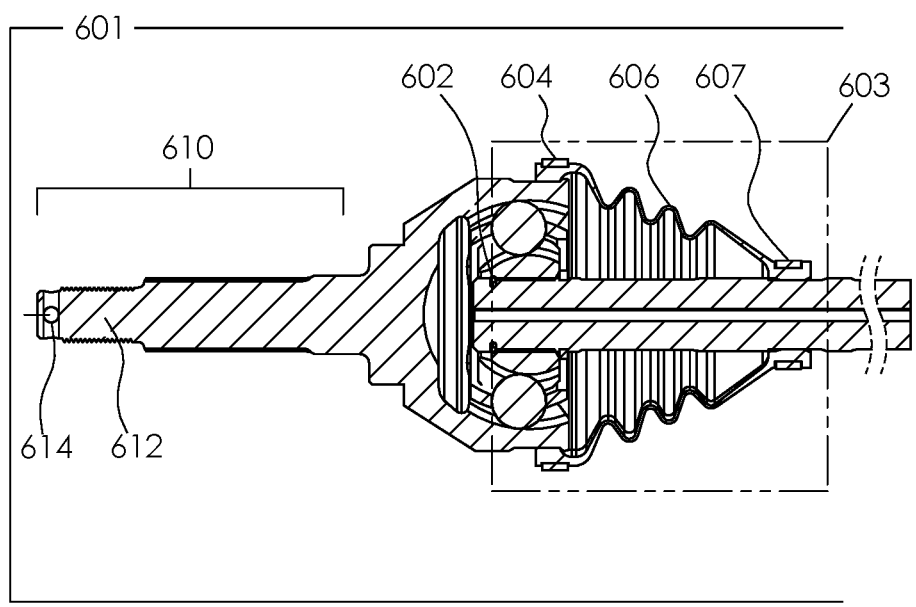
FIG. 6 depicts views of UTV rear wheel drive train elements and a wheel shaft for coupling with improved UTV performance resulting from use of a sealed double tapered roller wheel bearing.

FIG. 6 depicts a wheel shaft and boot assembly for coupling with the elements of FIGS. 4A-5B for improved UTV performance resulting from use of a sealed double tapered roller wheel bearing 100, 300. While the bearing 100, 300 is not shown in FIG. 6, when assembled, the shaft 610 passes through the center or opening of the bearing 100, 300 and the bearings is disposed adjacent (and to the right of) the splines on shaft 610 as shown in FIG. 6. Broadly speaking, FIG. 6, and more particularly element 601, is a drive train rear half shaft assembly. Element 602 is a circlip, C-clip, rotor clip, or snap ring, element 603 is a boot kit, element 604 is a clamp or boot clamp, and element 610 is a wheel axel or shaft. Element 612 is the threaded surface of the shaft 610 for receiving the nut 510, and element 614 is an opening through the shaft 610 for receiving the cotter pin 512.

When assembling a tire 504 to a UTV with the bearing 100, 300 as disclosed herein, a toe-in and toe-out camber of the tire will be desirably reduced from OEM configurations, with the camber (for a vehicle being jacked-up off the ground and no weight applied to the tire 504) being in a range of about 0-¼ in., or about 0-3/16 in for tires 504 with diameters in a range of 27 in-37 in. As a result, the wheel bearing 100, 300 being preloaded radially with respect to the shaft 610 and sealed from contaminants provides improved strength and performance.

Accordingly, manufacture of these components separately or simultaneously may involve extrusion, pultrusion, vacuum forming, injection molding, blow molding, resin transfer molding, casting, forging, cold rolling, machining, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g., a bolt, a nut, a screw, a nail, a rivet, a pin, and/or the like), wiring, any combination thereof, and/or the like for example, depending on, among other considerations, the particular material forming the components.

It will be understood that the assembly of wheel bearings are not limited to the specific order of steps as disclosed in this document. Any steps or sequence of steps of the assembly of the wheel bearing assemblies indicated herein are given as examples of possible steps or sequence of steps and not as limitations, since various assembly processes and sequences of steps may be used to assemble wheel bearing assemblies.

What is claimed is:

1. A UTV double row tapered wheel bearing assembly, comprising:
    an inner sleeve comprising an outer radial surface and a radially aligned circular ridge disposed at the outer radial surface configured to separate a first inner race and a second inner race;
    a first inner diameter race disposed around a first portion of the outer radial surface of the inner sleeve;
    a second inner diameter race disposed around a second portion of the outer radial surface of the inner sleeve;
    an outer diameter race radially offset from the first inner diameter race and the second inner diameter race, the outer diameter race comprising an outer flat radial surface and an inner tapered radial surface opposite the outer flat radial surface, the outer diameter race formed as a single integral member, wherein outer axial surfaces of the outer diameter race overhang the outer axial surfaces of the first inner diameter race and the second inner diameter race;
    a first ring of rollers disposed between the outer diameter race and the first inner diameter race, wherein the first ring of rollers comprises rollers that are frustoconically shaped;
    a second ring of rollers disposed between the outer diameter race and the second inner diameter race offset from the first ring of rollers, wherein the second ring of rollers comprises rollers that are frustoconically shaped;
    a first shield coupled to a first axial face of the bearing configured to seal the interior of the bearing, the first ring of rollers, and the second ring of rollers from external contaminates, wherein the first shield is press fit on the first inner diameter race and further seals with a stepped surface of the inner sleeve;
    a second shield coupled to the second axial face of the bearing and configured to seal the interior of the bearing, the first ring of rollers, and the second ring of rollers from external contaminates; and
    wherein the first shield and the second shield comprise seals that contact the inner radial surface of the outer race.

2. The UTV double row tapered wheel bearing assembly of claim 1, wherein the outer axial surfaces of the outer diameter race overhang outer axial surfaces of the inner sleeve.

3. The UTV double row tapered wheel bearing assembly of claim 1, wherein the preload to the wheel bearing is applied through tightening a nut to 40-180 ft-lbs of torque.

4. A UTV double row tapered wheel bearing assembly, comprising:
an inner sleeve comprising an outer radial surface;
a first inner diameter race disposed around a first portion of the outer radial surface of the inner sleeve;
a second inner diameter race disposed around a second portion of the outer radial surface of the inner sleeve;
an outer diameter race radially offset from the first inner diameter race and the second inner diameter race, the outer diameter race comprising an outer flat radial surface and an inner tapered radial surface opposite the outer flat radial surface, the outer diameter race formed as a single integral member,
a first ring of rollers disposed between the outer diameter race and the first inner diameter race;
a second ring of rollers disposed between the outer diameter race and the second inner diameter race offset from the first ring of rollers;
a first shield coupled to a first axial face of the bearing, wherein the first shield is press fit on the first inner diameter race and further seals with a stepped surface of the inner sleeve; and
a second shield coupled to the second axial face of the bearing.

5. The UTV double row tapered wheel bearing assembly of claim 4, wherein the inner sleeve comprises a radially aligned circular ridge that separates the first inner race and the second inner race.

6. The UTV double row tapered wheel bearing assembly of claim 4, wherein the first shield and the second shield are configured to seal the interior of the bearing and the first ring of rollers and the second ring of rollers from external contaminates.

7. The UTV double row tapered wheel bearing assembly of claim 6, wherein the first shield and the second shield comprise seals that contact the inner radial surface of the outer race.

8. The UTV double row tapered wheel bearing assembly of claim 7, wherein outer axial surfaces of the outer diameter race overhang outer axial surfaces of the first inner diameter race and the second inner diameter race.

9. The UTV double row tapered wheel bearing assembly of claim 4, wherein the preload to the wheel bearing is applied through tightening a nut to 40-180 ft-lbs of torque.

10. The UTV double row tapered wheel bearing assembly of claim 4, wherein the rollers of the first ring of rollers and of the second ring of rollers are frustoconically shaped.

11. A UTV double row tapered wheel bearing assembly, comprising:
a first inner diameter race;
a second inner diameter race axially offset from the first inner diameter race;
an outer diameter race radially offset from the first inner diameter race and the second inner diameter race, the outer diameter race formed as a single integral member,
a first ring of rollers disposed between the outer diameter race and the first inner diameter race;
a second ring of rollers disposed between the outer diameter race and the second inner diameter race;
a first shield coupled to a first axial face of the bearing, wherein the first shield is press fit on the first inner diameter race and further seals with a stepped surface of an inner sleeve; and
a second shield coupled to the second axial face of the bearing.

12. The UTV double row tapered wheel bearing assembly of claim 11, wherein:
outer axial surfaces of the outer diameter race overhang outer axial surfaces of the first inner diameter race and the second inner diameter race; and
the first shield and the second shield comprise seals that contact the inner radial surface of the outer race.

13. The UTV double row tapered wheel bearing assembly of claim 11, wherein the preload to the wheel bearing is applied by tightening a nut to 40-180 ft-lbs of torque.

14. A method of installing the UTV double row tapered wheel bearing assembly of claim 11, comprising tightening a nut on a wheel shaft 80-140 ft-lbs of torque, wherein the force presses the first shield against the inner diameter race, the inner diameter race presses against the first ring of rollers, and the first ring of rollers presses against the outer diameter race.

* * * * *